Oct. 11, 1949.   R. E. PAGE ET AL   2,484,114
RECORD PERFORATION ANALYZING MEANS
Filed July 16, 1946   2 Sheets-Sheet 1

INVENTORS
RALPH E. PAGE
HORACE S. BEATTIE
GEO. F. DALY
BY Frank W. Lownitzer
ATTORNEY Oct. 11, 1949.  R. E. PAGE ET AL  2,484,114

RECORD PERFORATION ANALYZING MEANS

Filed July 16, 1946  2 Sheets-Sheet 2

INVENTORS
RALPH E. PAGE
HORACE S. BEATTIE
BY  GEO. F. DALY
Frank W. Lowinzer
ATTORNEY Patented Oct. 11, 1949

2,484,114

UNITED STATES PATENT OFFICE 2,484,114

RECORD PERFORATION ANALYZING MEANS

Ralph E. Page and Horace S. Beattie, Poughkeepsie, and George F. Daly, Endicott, N. Y., assignors to International Business Machines Corporation, New York, N. Y., a corporation of New York Application July 16, 1946, Serial No. 684,076

6 Claims. (Cl. 235—61.6)

This invention relates to record controlled machines, and more particularly to the perforation analyzing mechanisms therefor.

It is the main object of the invention to devise a novel arrangement known as a "sensing commutator" which coordinates for each record column a perforation sensing means and an individual differentially timed impulse emitter comprising a commutator and rotor.

More specifically it is an object of the invention to devise a perforation analyzing mechanism for a record controlled machine which comprises for each record column a plurality of analyzing brushes, and a readout device comprising a commutator having one end of its contact elements engaged by said brushes through the card holes and the other end by a wiper for emitting differentially timed impulses according to the perforations sensed or analyzed.

Another object of the invention is to provide a construction of the above coordinated parts which enables their assembly in a narrow space commensurate with the width of the record columns.

Another object of the invention is to devise means to insulatably mount and assemble each analyzing unit and coordinated commutator and rotor so that they occupy no greater spacing than the width of a record column.

Another feature of the invention relates to the manner of electrically connecting the coordinated elements in a work control circuit so that even with the analysis of combinationally arranged holes representing alphabet data or the like the possibility of back circuits to unrelated orders is eliminated, whereby differentially timed impulses for a plurality of orders are independently transmitted to the related work control magnets under control of the sensing commutators.

Another object of the invention relates to the specific construction of the analyzing unit, the commutator and rotor of a sensing commutator which enables their fabrication and assembly by simple manufacturing processes.

Another object of the invention is to devise the analyzing unit, the commutator and rotor to have relations in an electrical sense which facilitates their manufacture and enables differentially timed impulses to be transmitted independently in each order under control of the sensing commutators without the possibility of back circuits.

In carrying out the preceding object the rotor is, in an electrical sense, common to the plurality of commutators since it is connected to one side of the line but the commutators and related analyzing units in the plurality of orders are insulated from each other so that from the analyzing units independent circuits to the work magnets for a plurality of orders may branch out.

A feature of the invention relates to the simple and efficient manner of constructing a brush carrying unit which comprises a single metal plate carrying spaced and angularly inclined analyzing brushes. The electrical relations expressed heretofore enables the construction of the unit as a unitary metallic piece with the brushes electrically connected and facilitates its manufacture.

Other objects of the invention will be pointed out in the following description and claims and illustrated in the accompanying drawings, which disclose, by way of example, the principle of the invention and the best mode, which has been contemplated, of applying that principle.

The card analyzing mechanism forming part of the present invention is particularly useful in card controlled machines wherein cards are analyzed at rest.

The sensing commutator arrangement has been devised for efficient electrical analysis of the type of perforated card shown in the patent to C. D. Lake, No. 1,772,492, granted August 12, 1930. In general, the card 10 has perforations which are rectangular in shape and are arranged in eighty vertical columns and in twelve horizontal rows through which perforations electrical circuits are closed to control functions of the machine.

Figure 1:
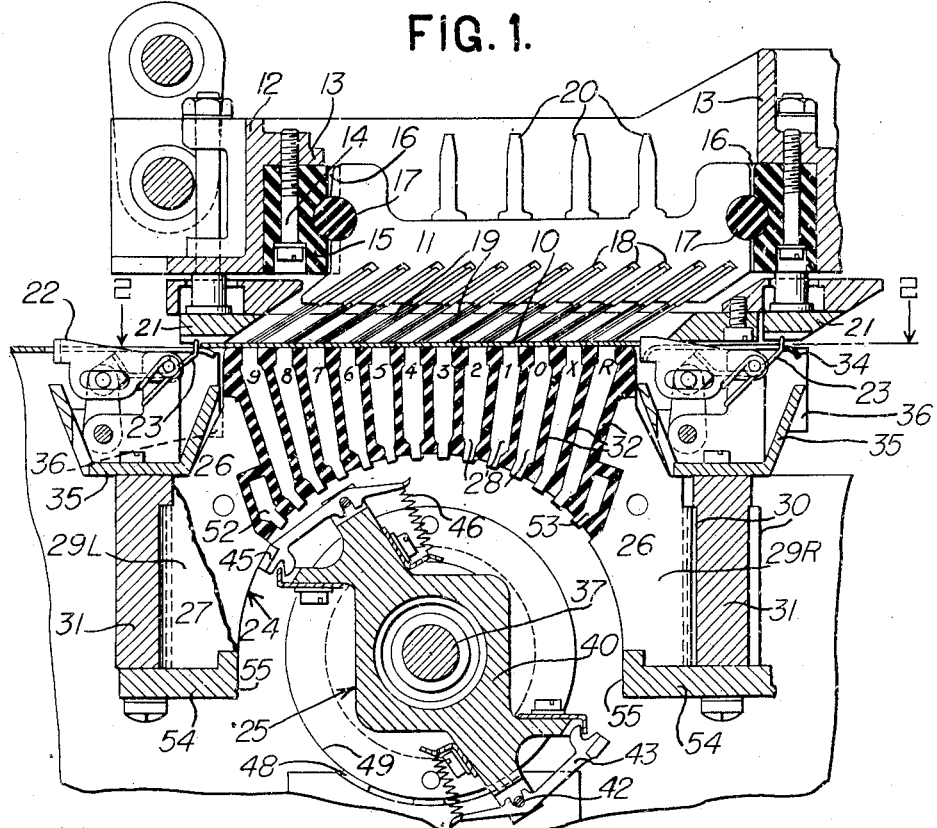
Fig. 1 is a sectional view showing for one analyzing station the coordination of the brush carrying unit, the commutator, and rotor for a single vertical card column.
Figure 3:
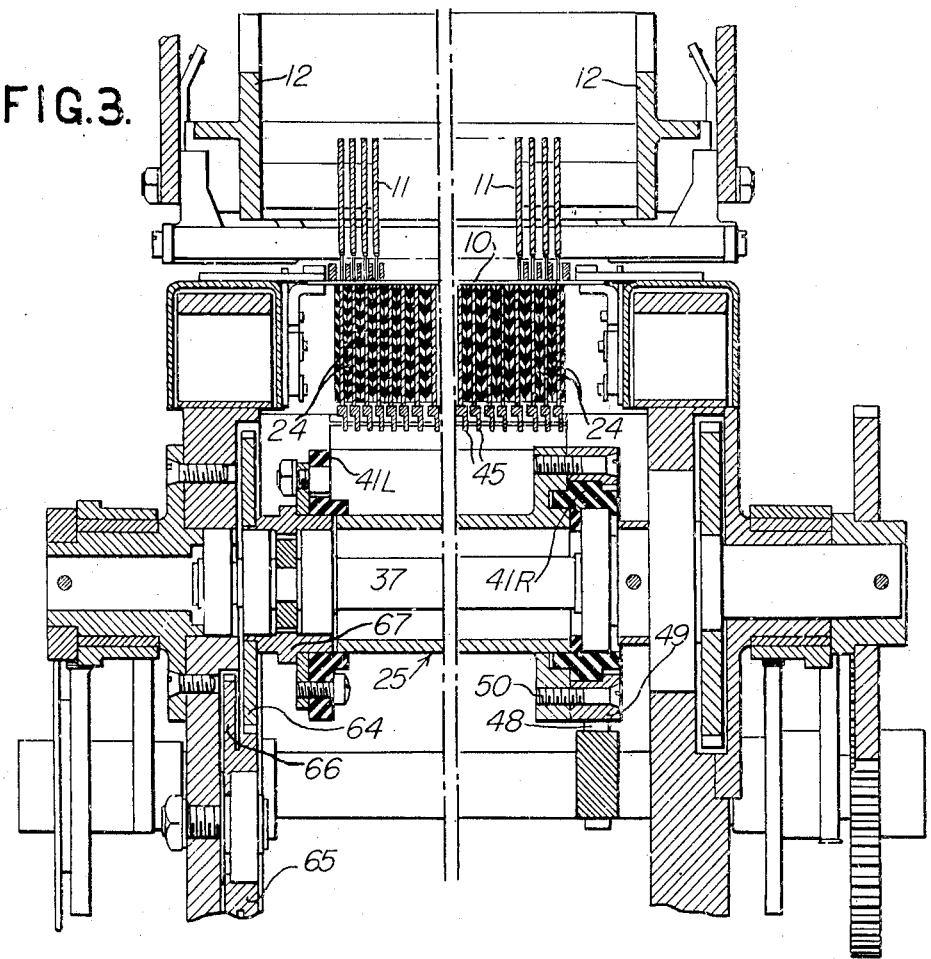
Fig. 3 is a transverse sectional view showing the coplanar relationship between an analyzing unit, commutator unit and related rotor.

A plurality of analyzing units 11, of which there is one for each vertical card column are carried by a frame member 12 which comprises a single metallic casting machined to form the configuration shown in section in Figs. 1 and 3. The frame member 12 is formed so as to be capable of mounting eighty analyzing units 11 for each analyzing station. Each analyzing or brush carrying unit comprises a metal plate which, in thickness, is less than the width of a record column and the plurality of brush carrying units 11 are mounted on the frame member 12 insulated from each other. The eighty analyzing units 11 are mounted to project downwardly through a rectangular opening 13 formed in the frame member 12. By means of mounting screws 14 transverse bars 15 of insulating material are carried by the frame member 12 and bars 15 are formed with slots 16 which receive the metal analyzing units 11 in such manner that they are insulatably spaced apart from each other but correlate the brushes 19 with the index point positions. The set of eighty analyzing units 11 for each analyzing station is, therefore, carried by the frame member 12 and when mounted thereon they are locked in position by rods 17 of insulating material. Rods 17 fit in semi-circular cutout portions formed at the ends of the analyzing units 11 and along the edge of each bar 15.

The specific construction of the analyzing units for carrying the analyzing brushes 19 is shown in Fig. 1 wherein it will be noted that the analyzing unit is slotted angularly with twelve slots to receive ferrules 18, each of which has secured therein two groups of analyzing brushes, with each group consisting of four wires to thereby provide an analyzing brush 19. The group arrangement of analyzing brushes 19 is similar to that shown in the patent to M. F. Hayes, No. 2,129,764 and permits movement of one group of wires independent of the other. The terminal ends of the analyzing brushes are ground flush so as to provide a straight edge to enable efficient electrical contact with a related contact member to be subsequently described.

Referring to Fig. 1, each analyzing unit 11 has an upstanding contact extension 20 and for eighty analyzing units 11 the extensions 20 are arranged in four staggered groups so as to enable selective wire connections or sliding contact to such extensions 20 without interference.

The analyzing brushes 19 are preferably inclined in the direction of feed of the card and are normally elevated while the cards are being fed to analyzing position. When the card to be analyzed is in analyzing position the analyzing frame is depressed as shown in Fig. 1 to cause the brushes to pass through perforations in the column analyzed.

The means for depressing the frame in a timed operation of the machine is fully shown and described in the application of G. F. Daly, Serial No. 677,593, filed June 19, 1946, and there is also shown in this application the means for feeding the cards in a successive manner to the two analyzing stations.

Another feature fully shown and described in the aforementioned application is the provision of means to effect lateral shift of the analyzing brushes 19 over the surface of the card so that the brushes 19 projecting through the perforations in the card will wipe over electrical contacts to clean them and make efficient electrical contact therewith. Means for effecting this operation is fully shown and described in the patent application mentioned. Herein, as shown in Fig. 1, to prevent the lateral shift of the card by the frictional engagement between the brushes and the upper surface of the card as the brushes 19 are shifted laterally, the frame 12 carries a clamping plate 21 which presses the card 10 against the surface of the card feeding bed. Incidental features also shown in Fig. 1 consist of a depressible card stop 22 and a shiftable aligning stop 23 which is actuated to shift the disaligned card against the fixed card stops 22.

Distinguishing from prior analyzing arrangements the readout device for reading out the perforations analyzed includes a commutator which is intimately and structurally coordinated with the analyzing brushes for each card column. A commutator is individual to each column to eliminate the possibility of back circuits even though combinational holes representing alphabet data are analyzed.

Figure 2:
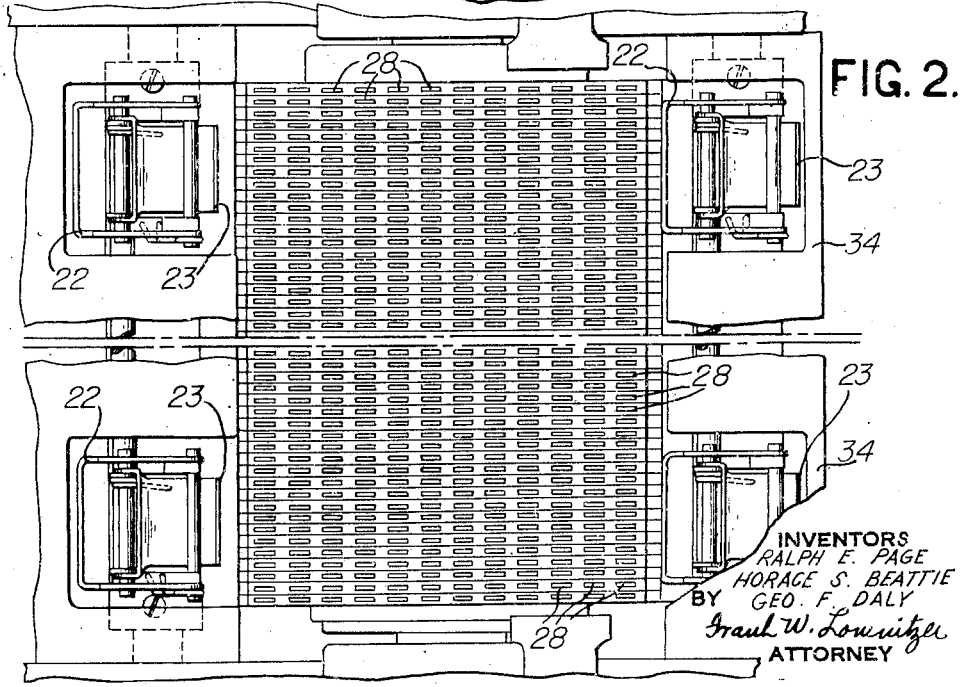
Fig. 2 is a plan view taken on the line 2—2 of Fig. 1 showing the smooth car bed surface provided by the upper surfaces of eighty commutator units for analysis of a well known form of control card.

In general, the readout device for each card column comprises a stator or commutator 24 and a related rotor 25. The commutator is constructed substantially in the same manner and by the method disclosed in the application of G. A. Giannuzzi et al., Serial No. 575,916 (now Patent No. 2,438,046), filed February 2, 1945, and each commutator consists of an intermediate metal sheet 26 and covering sheets of insulating material 27 (Fig. 1, left side) cemented at each side of the metal sheet. The method described in the aforementioned application provides a commutator unit of a thickness which corresponds to the width of a vertical card column and also provides a series of insulated commutator contact points 28, there being twelve of these for contact by the analyzing brushes. The contact points 28 have dual exposed ends, one end engaged by the analyzing brushes and the other end by the related wiper carried by rotor 25. The central metal piece 26 provides portions 29L and 29R which extend at each side beyond the sheets of insulating material 27 to fit in narrow slots 30 formed in mounting bars 31. By fitting the portions 29L, 29R in the slots in the bars 31 the commutator units are positioned adjacent each other and in alignment with the analyzing units and eighty commutator units closely assembled provide at the top a smooth card bed surface (see Fig. 2) over which the card 10 may be fed from right to left without interference.

By the method disclosed in the application of G. A. Giannuzzi, Serial No. 575,916, each commutator unit 24 is provided with a series of contact points 28 designated 9–1, O, X, R for analysis of the corresponding index point positions in each vertical card column. The contact points 28 are insulated from each other by intermediate insulating material 32. The upper exposed ends of the commutator points 28 are machined along a straight line to provide said smooth card bed surface, whereas the lower portions of the commutator contact points 28 may project downwardly beyond the side cover plates 27 to provide exposed projecting contact points with which a wiper of a rotor cooperates. Adjacent to the assembly of eighty of such commutator units are card feed guide plates 33 and 34.

In order to further hold the commutator units in assembled position there is provided a plurality of bars 35 formed with spaced ears 36 between which upper side portions of alternate commutator units 24 may fit.

From Fig. 1 it is evident that the lower portion of the commutator points 28 are concentrically arranged and associated therewith is a rotor 25 which is driven one-half revolution for each machine cycle. The rotor 25 is loosely mounted on a shaft 37 and attached to each end of the rotor 25 are disks 41L and 41R (Fig. 3) which are of insulating material and which are bearing-mounted on shaft 37 in any suitable manner. To the disk 41L there is secured a sleeve 67 to which is secured a gear 64. The gear 64 meshes with a gear 65 to which is secured a larger gear 66 and as fully disclosed in the aforementioned patent application the main drive shaft rotates the gear 66 one complete revolution for each machine cycle. The ratio of the gear drive to the rotor 25 is such that the rotor is driven one-half revolution for each machine cycle.

The rotor 25 carries rods 42 on each of which is pivoted a series of wipers 43, each of said wipers being guided by slots 44 in the casting. Each wiper 43 is urged by a spring 46 to cause a wiper portion 45 to engage with the contact points 28 in succession. There are eighty wipers 43 mounted on each rod 42 and thus one-hundred and sixty in the aggregate on each rotor assembly.

In the position shown in Fig. 1 the rotor, as it rotates clockwise, causes the contact portion 45 to make contact with contact points 28 in the order 9–1, O, X, and R which differentially times the impulses. Current to the rotor is provided by connecting one side of the line to a brush 48 (Fig. 3) which makes continuous electrical contact with a collector ring 49. Said collector ring 49 is attached to the rotor 25 by screws 50 to make an electrical connection between the rotor and ring 49. The two sets of wipers 43 are utilized to alternately cooperate with the commutators 24 since rotor 25 is driven one-half revolution for each machine cycle.

Each commutator 24 has additional insulated metal inserts 52 and 53. With these it is possible to have a circuit breaker close the circuit and supply current to the "9" contact point 28 when the wiper portion 45 bridges the insert 52 and "9" contact point 28. Similarly, at the end of the entry part of the cycle it is possible to hold the circuit closed as contact portion 45 leaves the "R" contact point 28 at a time when it would be just touching the insert 53. Also insert 52 retains the wiper contact portion 45 downwardly as it passes from 29L to the "9" contact point 28 and insert 53 from the "R" point 28 to 29R. Thus, the possibility of wiping away intermediate insulating material which would be at the places where inserts 52 and 53 are, is eliminated.

Secured to each of the supporting bars 31 is a bar 54 which is provided with a surface 55 which is tangent to the concentric contact surfaces of the commutator 24. These bars are hardened at surfaces 55 to provide means to engage with the wiper contact portion 45 to cam each wiper 43 downwardly into correct position before it strikes the softer berillium copper contact surfaces engaged by the wiper portion 45 and thus protects entering surfaces and eliminates wear.

Figure 4:
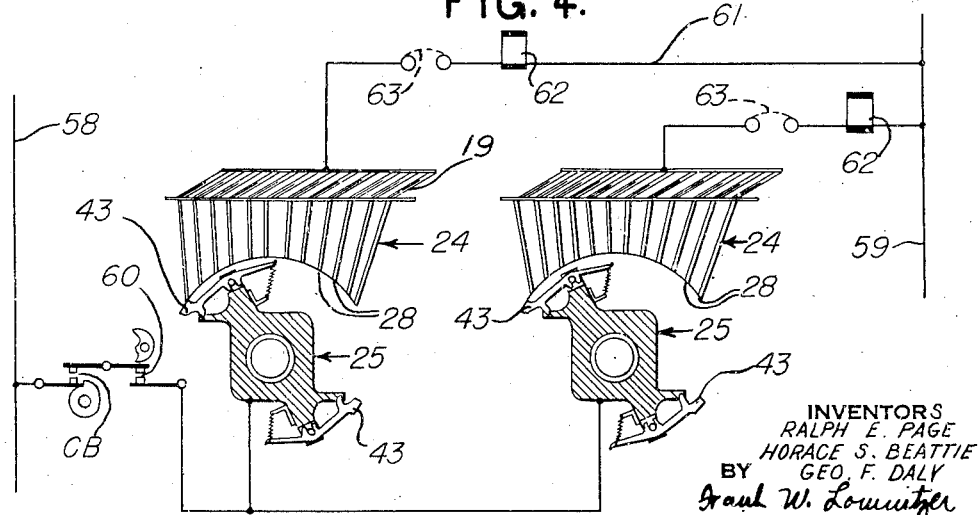
Fig. 4 is a diagram of the work circuits utilizing the present sensing commutator arrangement for two orders, by way of example.

The preferred circuit arrangement for wiring up the electrical instrumentalities is shown in Fig. 4 which discloses the instrumentalities in diagrammatic form.

The power supply lines are indicated by 58 and 59 and the rotor 25 is connected to the line 58 through card lever contacts 60 and a circuit breaker CB which close the circuit during the time that the differentially timed impulses are transmitted. In the absence of a card at an analyzing station the card lever contacts 60 are opened and rotor 25 is disconnected from the power supply. While the connection to the rotor 25 is shown by wires actually this is effected by the brush 48 and collector ring 49 shown in Fig. 3. The circuit for each order extends from line side 58, contacts 60, CB contacts, the rotor 25, the wiper 43, the commutator contact segments 28, the analyzing brushes 19 to wire 61. The work control magnets 62 may be clutch control magnets for an accumulator or magnets which control the setting of a printing mechanism and by plug connections 63 the circuit may be completed from the analyzing unit 19 of a particular order to the related order work magnet 62. The rotor 25 is timed so as to transmit differentially timed impulses according to the brushes 19 which pass through the card perforations.

It will be noted that from the analyzing unit 11 of each order a separate circuit branches to the related control magnet 62 and these independent circuit connections eliminate the possibility of back circuits from one order to another.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a record perforation analyzing arrangement for each record column, the combination of a row of analyzing elements for each record column for simultaneously analyzing the index point positions in a column, a perforation readout device for each row of analyzing elements comprising a movable wiper and a commutator unit carrying contact elements having dual exposed ends directly engageable at one exposed end by said analyzing elements through the perforations, and at another exposed end by said wiper, and means for rotating said wiper for completing a work circuit at a differential time through said wiper, contact element and analyzing element when said wiper engages a contact element commonly engaged by said wiper and an analyzing element.

2. A perforation analyzing readout device for each record column comprising, a plurality of analyzing brushes arranged in one plane for simultaneously analyzing the index point positions in a column, a commutator including contact elements in said plane having dual exposed ends, one exposed end arranged on an outer straight surface for contact by said analyzing brushes through the perforations, and other exposed ends arranged on an inner circular surface, a rotatable wiper coacting with said contact elements on the inner circular surface of the commutator, and means for rotating said wiper to coact with said contact elements in succession to complete a work circuit through the wiper, contact element and analyzing element when said wiper engages a contact element commonly engaged by said analyzing element through a card perforation.

3. In a record controlled machine controlled by a record having a plurality of columns wherein each column is provided with a plurality of index point positions, a commutator unit carrying a plurality of contact elements which are exposed at both ends, an analyzing unit carrying a plurality of analyzing elements corresponding to said contact elements for simultaneously analyzing the index point positions of a record column and engageable directly with one exposed end of said contact elements through the record perforations in an operatively associated record column, a wiper, means for rotating said wiper to contact in succession the other exposed end of said contact elements for completing a work circuit when said wiper engages a contact element which is contacted by said wiper and an analyzing element through a record perforation, and means for mounting to coordinate for each record column a commutator unit, an analyzing unit, and a related wiper in a coplanar arrangement and with the analyzing and commutator units in operative association with a record column.

4. An analyzing arrangement for a machine controlled by a perforated record having a plurality of columns, each column having a certain width and bearing a plurality of index point positions comprising, a commutator unit having a thickness commensurate with the width of a record column carrying a row of contact elements which are exposed at both ends for engagement, a support plate having a thickness equivalent to the width of a record column carrying a row of analyzing elements corresponding in number to said contact elements for simultaneously analyzing said index point positions and directly engaging one exposed end of said contact elements through the record perforations, a wiper for each record column, means for rotating said wiper to contact the other exposed ends of said contact elements in succession for transmitting at differential times impulses through said wiper, contact element, and related analyzing element upon engagement of a contact element commonly engaged by said wiper and a related analyzing element, and means for mounting to coordinate within the width of each record column said support plate, a commutator unit and related wiper in a coplanar arrangement and with the analyzing elements and commutator contact elements in operative association with the record column analyzed thereby.

5. In a perforated record analyzing arrangement, the combination of a commutator unit for each record column carrying a series of insulated contact elements exposed at both ends and providing at one end an outer smooth surface, means for assembling a plurality of said commutator units corresponding in number to the record columns in a juxta-position relationship to provide at the outer surfaces a smooth card bed surface over which a record to be analyzed is fed to analyzing position, an analyzing unit carrying a row of electrically interconnected analyzing elements corresponding in number to said contact elements, a frame for insulatably carrying a plurality of said analyzing units corresponding to the number of record columns and movable to project the plurality of rows of analyzing elements through the perforations in the correlated record columns to engage the contact elements at the outer surfaces of the commutator units, a wiper for each commutator unit, means for rotating said wiper for making electrical contact with other ends of the contact elements of the related commutator unit in succession to transmit at differential times impulses through said wiper, analyzing element and the contact element commonly engaged by said wiper and an analyzing element to a work circuit having an electrical connection to the related metal analyzing unit, and means for mounting for each record column a commutator unit in operative association with each analyzing unit and a wiper in operative association with each commutator unit.

6. An electrical analyzing arrangement for a machine controlled by a perforated record having a plurality of columns, each column being provided with a plurality of index point positions comprising, an electrical power supply, a commutator unit carrying a row of contact elements which are exposed at both ends for engagement, a metal support plate for each record column carrying a corresponding number of electrically interconnected analyzing elements which simultaneously analyze said index point positions of a record column and directly electrically contact one end of said contact elements through the perforations, a rotor common to the analyzing arrangement for a plurality of record columns and electrically connected to one side of the power supply, a wiper for each record column carried by said rotor and each adapted to engage the other ends of the contact elements of the related commutator unit in succession, a work control instrumentality connected to the other side of the power supply and to said metal support plate, and means for rotating said rotor to render said instrumentality operative when said wiper engages a contact element commonly engaged by said wiper and a related analyzing element.

RALPH E. PAGE.
HORACE S. BEATTIE.
GEORGE F. DALY.

REFERENCES CITED

The following references are of record in the file of this patent:

UNITED STATES PATENTS

| Number | Name | Date |
|---|---|---|
| 2,138,636 | Lake | Nov. 29, 1938 |
| 2,238,873 | Nelson | Apr. 15, 1941 |
| 2,318,325 | Nichol et al. | May 4, 1943 |